US012291922B2

(12) United States Patent
Chen et al.

(10) Patent No.: US 12,291,922 B2
(45) Date of Patent: May 6, 2025

(54) INTEGRATED CONTROL TYPE HOLLOW CURTAIN

(71) Applicant: Yan Chen, Guangdong (CN)

(72) Inventors: Yan Chen, Guangdong (CN); Yangli Deng, Guangdong (CN); Weipin Song, Guangdong (CN)

( * ) Notice: Subject to any disclaimer, the term of this patent is extended or adjusted under 35 U.S.C. 154(b) by 210 days.

(21) Appl. No.: 17/879,795

(22) Filed: Aug. 3, 2022

(65) Prior Publication Data

US 2024/0044203 A1 Feb. 8, 2024

(51) Int. Cl.

| | |
|---|---|
| ***E06B 9/32*** | (2006.01) |
| ***E06B 9/322*** | (2006.01) |
| ***E06B 9/38*** | (2006.01) |
| *E06B 9/24* | (2006.01) |

(52) U.S. Cl.

CPC ................ *E06B 9/322* (2013.01); *E06B 9/38* (2013.01); *E06B 2009/2476* (2013.01); *E06B 2009/3222* (2013.01)

(58) Field of Classification Search

CPC . E06B 9/264; E06B 9/32; E06B 9/322; E06B 9/38; E06B 2009/2643; E06B 2009/2476; E06B 2009/3222

See application file for complete search history.

(56) References Cited

U.S. PATENT DOCUMENTS 4,096,903 A * 6/1978 Ringle, III ............. E06B 9/322 318/467
4,649,980 A * 3/1987 Kunz ........................ E06B 9/24 160/310
5,760,558 A * 6/1998 Popat ........................ E06B 9/32 160/188
5,769,142 A * 6/1998 Nicolosi ................. E06B 9/264 160/166.1
7,281,561 B2 * 10/2007 Anderson ............... E06B 9/264 52/204.5
7,681,618 B2 * 3/2010 Nicolosi ................ E06B 9/264 160/241

(Continued)

FOREIGN PATENT DOCUMENTS

CN 203480446 U * 3/2014
CN 108894709 A * 11/2018

(Continued)

OTHER PUBLICATIONS

English translation CN203480446 (Year: 2013).*
English Translation CN112081515 (Year: 2020).*

*Primary Examiner* — Johnnie A. Shablack

(57) ABSTRACT

The present invention relates to an integrated control type hollow curtain, including a front glass panel, a rear glass panel and a curtain body frame. The front glass panel and the rear glass panel are hermetically connected to front and rear surfaces of the curtain body frame to form a hollow curtain with a sealed cavity. An electronic control system and a solar panel are arranged in the top of the sealed cavity. According to the present invention, both the electronic control system and the solar panel are placed in an inner cavity of hollow glass, such that the appearance of a curtain product is simple and attractive, and important components can be protected, thereby avoiding the risk of damage caused by an external environment, and reducing the failure rate.

2 Claims, 3 Drawing Sheets

(56) References Cited

U.S. PATENT DOCUMENTS

| | | | | |
|---|---|---|---|---|
| 9,081,246 | B2 * | 7/2015 | Rozbicki | H02J 50/12 |
| 10,303,035 | B2 * | 5/2019 | Brown | H04L 12/4625 |
| 10,538,959 | B2 * | 1/2020 | Gardiner | E06B 9/322 |
| 10,673,121 | B2 * | 6/2020 | Hughes | G02F 1/163 |
| 10,914,114 | B2 * | 2/2021 | Blush | G02F 1/19 |
| 10,975,617 | B2 * | 4/2021 | Nicolosi | E06B 9/42 |
| 11,180,953 | B2 * | 11/2021 | Snader | E06B 3/6722 |
| 11,203,897 | B2 * | 12/2021 | On | E06B 9/72 |
| 11,313,173 | B2 * | 4/2022 | Shinar | E06B 9/24 |
| 11,342,791 | B2 * | 5/2022 | Rozbicki | G02F 1/163 |
| 11,639,632 | B2 * | 5/2023 | Cheung | E06B 9/30 160/87 |
| 2007/0144683 | A1 * | 6/2007 | Krochmal | E06B 9/264 160/107 |
| 2011/0017408 | A1 * | 1/2011 | Maksan | E06B 9/264 160/168.1 R |
| 2020/0300036 | A1 * | 9/2020 | Tan | E06B 9/322 |
| 2021/0108457 | A1 * | 4/2021 | Passoni | E06B 9/264 |
| 2022/0307318 | A1 * | 9/2022 | Biffi | E06B 9/264 |
| 2022/0381085 | A1 * | 12/2022 | Diehl | H01Q 1/38 |
| 2023/0203879 | A1 * | 6/2023 | Deng | E06B 9/50 160/84.02 |
| 2023/0228146 | A1 * | 7/2023 | Adebiyi | E06B 9/36 160/236 |
| 2024/0044203 | A1 * | 2/2024 | Chen | E06B 9/264 |

FOREIGN PATENT DOCUMENTS

| | | | | | |
|---|---|---|---|---|---|
| CN | 112081515 | A | * | 12/2020 | E06B 9/264 |
| CN | 112081516 | A | * | 12/2020 | E06B 9/264 |
| CN | 115341842 | A | * | 11/2022 | |
| EP | 2733298 | A2 | * | 5/2014 | E06B 9/264 |

* cited by examiner

INTEGRATED CONTROL TYPE HOLLOW CURTAIN

BACKGROUND OF THE INVENTION

The present invention relates to the field of hollow curtains, in particular to an integrated control type hollow curtain.

Most of conventional sunshade curtains on the market are mechanically controlled. The curtain is wound or unwound by pulling a pull rope arranged on the side of a curtain body. The mechanical control has the problems of a complicated structure and tedious installation steps, and is likely inaccurate, for example, involuntary sliding of the curtain body leads to many customer complaints.

As a result, electronically controlled sunshade curtain products have appeared to replace the above-mentioned mechanically controlled sunshade curtains. In addition, in order to respond to the national call for energy conservation and emission reduction, electronically controlled sunshade curtain products are combined with solar panels, light energy is converted into electrical energy to provide power for drive motors, and curtain shafts are driven to operate for winding or unwinding the curtains.

However, most of solar panels or electronic control components are exposed to an external environment currently, causing these important components to be easily damaged, such as being corroded with rainwater, oxidized with air, etc.

Therefore, the above problems need to be solved.

BRIEF SUMMARY OF THE INVENTION

In order to overcome the deficiencies in the prior art, the present invention provides an integrated control type hollow curtain.

The technical solution of the present invention is as follows:

An integrated control type hollow curtain, including a front glass panel, a rear glass panel and a curtain body frame, the front glass panel and the rear glass panel being hermetically connected to front and rear surfaces of the curtain body frame to form a hollow curtain with a sealed cavity, wherein an electronic control system and a solar panel are arranged in the top of the sealed cavity;

the electronic control system comprises a drive motor, a main control board and a battery; the main control board integrates a wireless transceiver and a control chip; the wireless transceiver is configured to obtain a control signal of a wireless remote controller and then transmit the signal to the control chip; the wireless remote controller and the wireless transceiver are connected in a paired manner via a magnetic inductive code pairing key; and the control chip is configured to receive the control signal and send an instruction to the drive motor to control operation of the drive motor.

According to the present invention adopting the above solution, the top of the curtain body frame is provided with a front baffle and a rear baffle; and the front baffle and the rear baffle are connected to define a rectangular cavity for shielding the electronic control system.

Further, the front baffle is a straight plate, and the rear baffle is a C-shaped folded plate; the rear baffle comprises a side plate, an upper plate and a lower plate; and the front baffle, the side plate, the upper plate and the lower plate define the rectangular cavity.

Furthermore, upper and lower sides of the front baffle are provided with inner hook edges; edges of the upper plate and the lower plate of the rear baffle are provided with grooves that are respectively adapted to the two inner hook edges of the front baffle; and the inner hook edges are slidably connected with the corresponding grooves.

Further, the middle of an inner wall of the rear baffle is provided with a raised transverse division bar; the drive motor is installed above the transverse division bar; the battery is installed below the transverse division bar; and the drive motor is stacked on the battery.

Further, a distance between a upper plate and a lower plate of the rear baffle is equal to a sum of heights of the drive motor and the battery.

Further, the solar panel is installed on an outer surface of the rear baffle.

According to the present invention adopting the above solution, the wireless transceiver is provided with a receiving antenna, and the receiving antenna is a flexible circuit board (FPC) antenna.

Further, the FPC antenna is attached to an inner side surface of the front baffle or the rear baffle at the top of the curtain body frame.

According to the present invention adopting the above solution, the magnetic inductive code pairing key is arranged at a position, close to the main control board, of the front glass panel.

According to the present invention adopting the above solution, both a length of the front glass panel and a length of the rear glass panel are greater than a length of the curtain body frame, and the both widths are also greater than the width of the curtain body frame, such that a circle of recesses are formed in an outer side of the hollow curtain.

According to the present invention adopting the above solution, the main control board, the drive motor and the battery are arranged on one side of the top of the curtain body frame; and the solar panel is arranged on the other side of the top of the curtain body frame.

According to the present invention adopting the above solution, the present invention has the following beneficial effects:

1. According to the present invention, the battery, the drive motor, the main control board, the solar panel and other components are placed in an inner cavity of hollow glass, such that a curtain product is simple and attractive in appearance and convenient to install, and important components can be protected, thereby avoiding the risk of damage caused by an external environment, and reducing the failure rate and the maintenance cost.
2. According to the present invention, the wireless remote controller is used for electronic control, and compared with a mechanical control structure, it is reduced in size, such that the hollow curtain product is more compact in structure, and tedious steps of field installation of the mechanical control structure are avoided.
3. For the wireless control function of the present invention, magnetic inductive code pairing is used for pairing, such that the operation is convenient, the response is more sensitive, and the user experience is improved.
4. The receiving antenna of the wireless transceiver adopts the FPC antenna, such that there are no problems of antenna scattering and space occupation, and the sensitivity and stability of the control signal are ensured.

Figure 1:
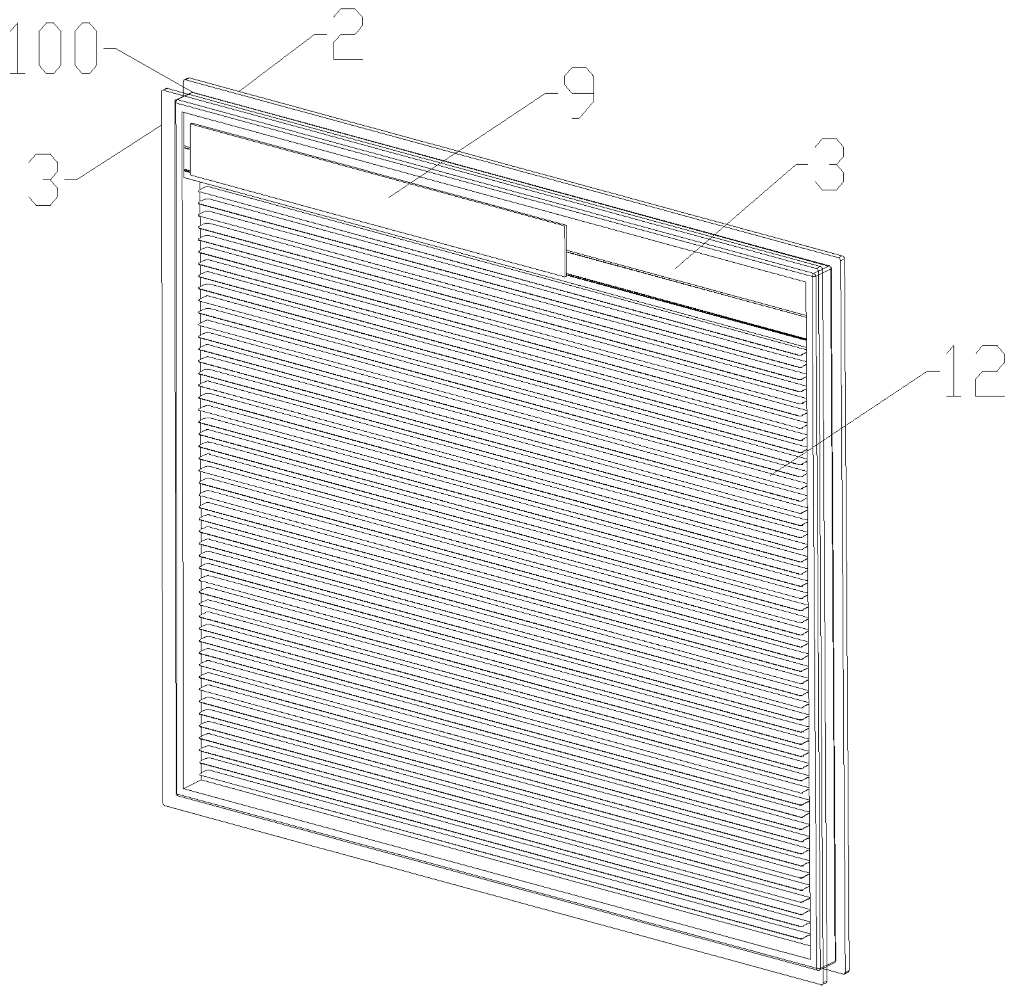
FIG. 1 is a schematic structural diagram of the present disclosure.

In the figures: 1: curtain body frame; 11: curtain shaft; 12: curtain piece;

2: front glass panel; 3: rear glass panel;

4: front baffle; 41: inner hook edge;

5: rear baffle; 51: upper plate; 52: lower plate; 512: groove; 53: transverse division bar;

6: main control board; 7: battery; 8: drive motor; 9: solar panel; 10: magnetic inductive code pairing key; and

100: recess; 101: a width of the rear glass panel; 102: a width of the curtain body frame; 103: a length of the rear glass panel; 104: a length of the curtain body frame.

DETAILED DESCRIPTION OF THE INVENTION

In order to better understand the objectives, technical solutions and technical effects of the present invention, the present invention is further described in detail below with reference to the accompanying drawings and the embodiments. Meanwhile, it is stated that the embodiments described below are only used to explain the present invention rather than limiting the present invention.

It should be noted that when an element is referred to as being "fixed to" or "arranged on" another element, it can be directly on another element or an intervening element may also be present. When an element is referred to as being "connected" to another element, it can be directly connected to another element or an intervening element may also be present.

The orientations or positions indicated by the terms "upper", "lower", "left", "right", "front", "rear", "vertical", "horizontal", "top", "bottom", "inside", "outside" and the like are orientations or positions shown in the drawings, which are used only to facilitate description, and cannot be understood as a limitation to the technical solution.

Figure 2:
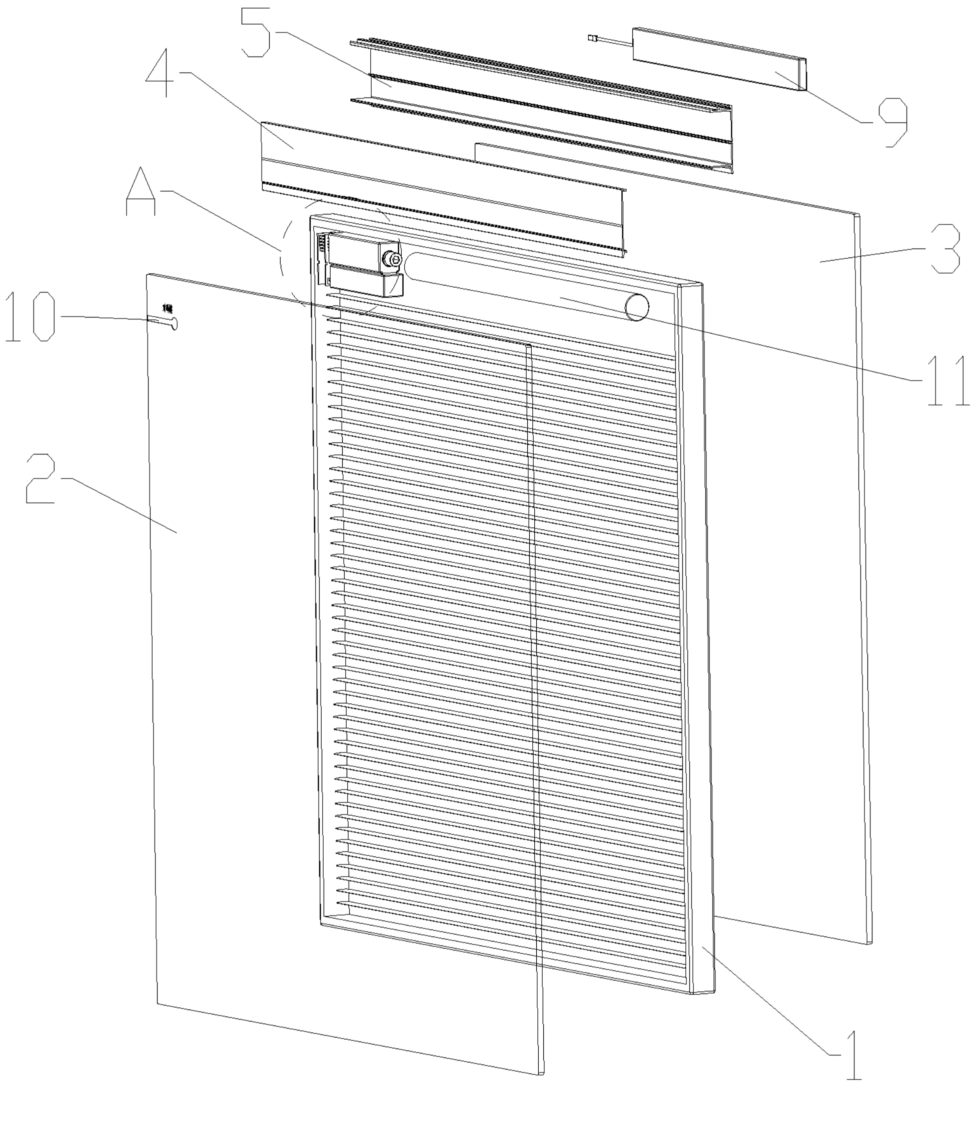
FIG. 2 is a structural exploded view of the present disclosure.
Figure 3:
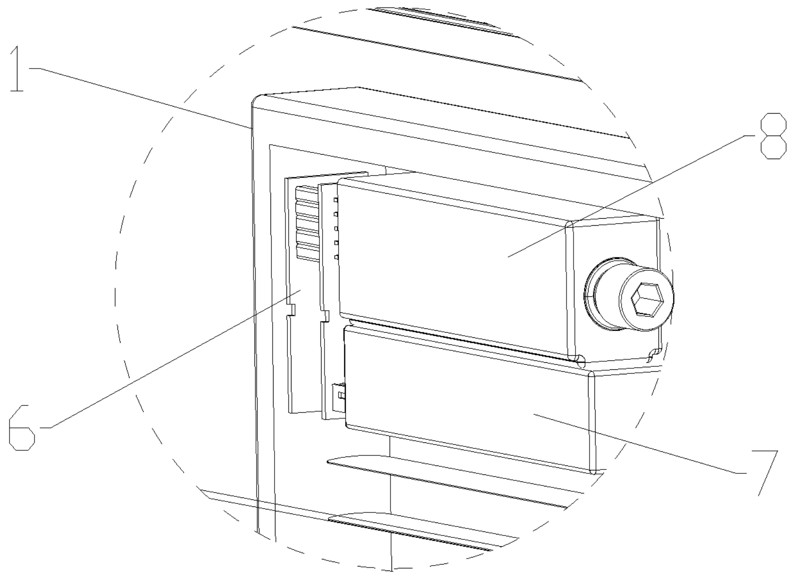
FIG. 3 is an enlarged view of A in FIG. 2.

As shown in FIG. 1 to FIG. 3, an integrated control type hollow curtain includes a front glass panel 2, a rear glass panel 3 and a curtain body frame 1; the front glass panel 2 and the rear glass panel 3 are connected to front and rear surfaces of the curtain body frame 1; and the joints between the glass panels and the curtain body frame 1 are sealed to form an internally hollow and sealed curtain. Curtain pieces 12, a drive motor 8, a curtain shaft 11, a main control board 6, a battery 7 and the like in the curtain body frame 1 are well protected in a sealed space, thereby reducing the influence of an external environment on the internal components, greatly reducing the failure rate, and prolonging the service life of a curtain product.

In this solution, a lengths of the front glass panel 2 and a length of the rear glass panel 103 are greater than a length of the curtain body frame 104, and a width of the front glass panel 2 and a width of the rear glass panel 101 are greater than a width of the curtain body frame 102, such that after the two glass panels are connected with the curtain body frame 1, recesses 100 are formed in side surfaces of the periphery of the hollow curtain. Recesses 100 in side surfaces of the periphery of hollow glass have two purposes as follows: side edges of the hollow glass can be inserted into an installation position of the curtain, the installation is simple, and the firmness of installation can be ensured; and light bars can also be arranged inside the recesses to add the luminous or decorative function of the hollow curtain.

The top of the curtain body frame 1 is provided with a front baffle 4 and a rear baffle 5 to shield a hollow curtain control system in a top area of the frame, making the hollow curtain as a whole more concise and attractive.

Figure 4:
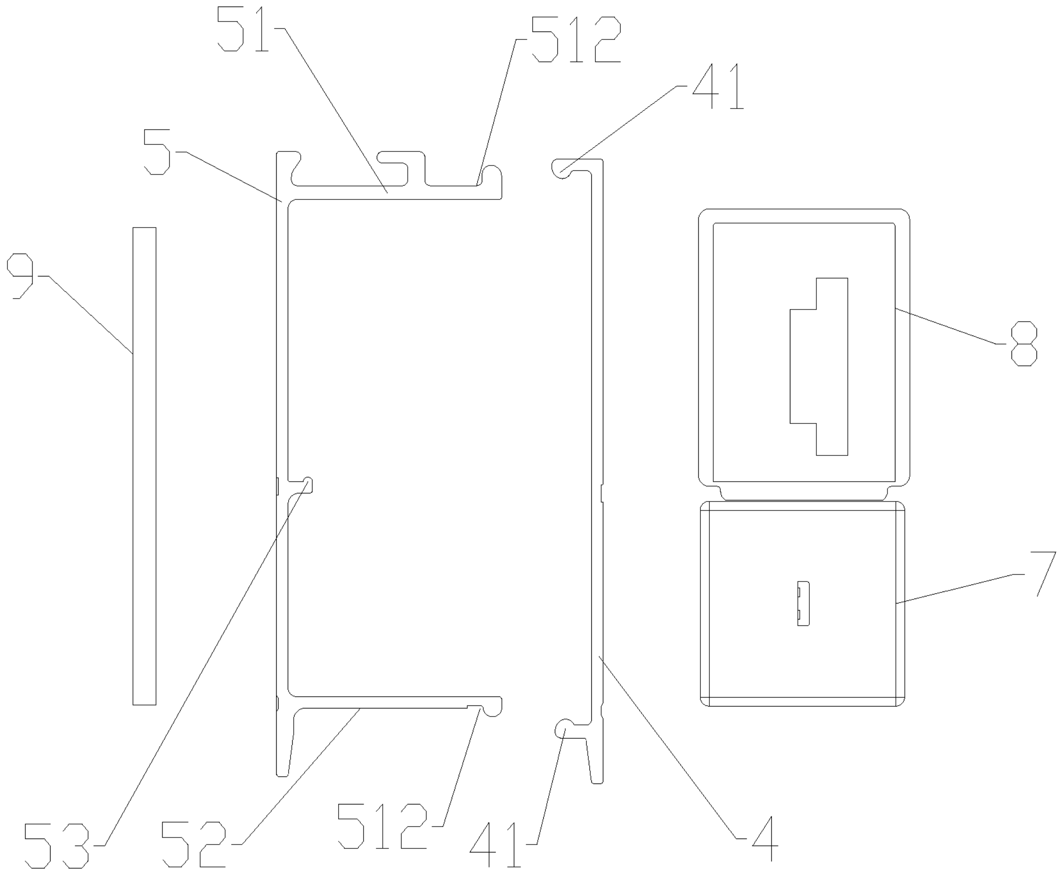
FIG. 4 is a structural exploded view of a baffle at the top of a curtain body frame in the present invention.

As shown in FIG. 4, the front baffle 4 is a straight plate, and the rear baffle is a C-shaped folded plate; the rear baffle 5 includes a side plate, an upper plate 51 and a lower plate 52; and after the front baffle 4 and the rear baffle 5 are connected together, the front baffle 4, the side plate, the upper plate 51 and the lower plate 52 define a rectangular cavity for placing an electronic control system, such as the drive motor 8, the battery 7, the main control board 6 and the like, thereby providing further protection for the control system of the curtain.

Upper and lower sides of the front baffle 4 are provided with inner hook edges 41; edges of the upper plate 51 and the lower plate 52 of the rear baffle 5 are provided with grooves 512 that are respectively adapted to the two inner hook edges 41 of the front baffle 4; and during connection, the inner hook edges 41 of the front baffle 4 slide into the grooves along the grooves 512 of the rear baffle 5 from a side direction, until the ends of the front baffle 4 and the rear baffle 5 are aligned with each other. The front baffle 4 and the rear baffle 5 are both made of plastics or aluminum profiles.

The middle of an inner wall of the rear baffle 5 is provided with a raised transverse division bar 53; the drive motor 8 is installed above the transverse division bar 53; the battery 7 (a lithium battery) is installed below the transverse division bar 53; and the drive motor 8 is stacked on the battery 7. A distance between the upper plate 51 and the lower plate 52 of the rear baffle 5 is equal to a sum of the heights of the drive motor 8 and the battery 7, such that the rectangular cavity defined by the front baffle and the rear baffle 5 can be just loaded with the longitudinally stacked drive motor 8 and the battery 7. Therefore, the drive motor 8 and the battery 7 in the present invention can be fixed in the hollow curtain by means of the upper plate 51 and the lower plate 52, without being installed by use of additional connecting pieces. In addition, a top control portion of the hollow curtain in the present invention has a compact structure, thereby preventing a top control area from being too large, and reserving a larger space for the curtain pieces 12 below. By adopting the product in this solution, better indoor light transmission can be obtained.

In the present invention, the hollow curtain is provided with a solar panel 9. The solar panel 9 is installed on an outer surface of the rear baffle 5 and positioned inside the hollow glass to provide protection for the solar panel 9 and prevent the solar panel 9 from being exposed to the external environment to be corroded with rainwater and oxidized with air for a long time to cause consumption and drop, such that the present invention can prolong the service life of the solar panel 9.

In the present invention, the electronic control system of the hollow curtain includes the main control board 6, the drive motor 8 and the lithium battery, and the main control board 6 integrates a control chip, a wireless transceiver and the like. The control chip is configured to receive a signal and send an instruction to the drive motor 8 to control forward or reverse rotation of the drive motor 8 to complete the winding and unwinding of the curtain; the wireless transceiver is configured to obtain a control signal of a wireless remote controller and then transmit the signal to the control chip; the wireless remote controller needs to be subjected to code pairing with the wireless transceiver before use; a magnetic inductive code pairing key 10 of the wireless transceiver is arranged at a position, close to the main control board 6, of the front glass panel 2, and the back of the wireless remote controller is provided with a magnet; and the wireless remote controller is close to the magnetic inductive code pairing key 10, and then a key P2 (code pairing key) on the wireless remote controller is pressed to complete code pairing, such that a control instruction can be sent to the control system of the hollow curtain via the wireless remote controller.

According to the present invention, when the hollow curtain is installed, the front glass panel 2 provided with the inductive code pairing key should face the inside, and the surface provided with the solar panel 9 should face the outside, such that a user can complete the pairing between the wireless remote controller and the electronic control system indoors, and the solar panel 9 can also receive outdoor light.

In the present invention, the wireless transceiver is equipped with a receiving antenna, which can improve the signal receiving sensitivity. The receiving antenna is a flexible printed circuit (FPC) antenna. The FPC antenna is attached to an inner side surface of the front baffle 4 or the rear baffle 5, such that there are no problems of antenna scattering and space occupation, and the sensitivity and stability of the control signal are ensured.

The drive motor 8 is connected with the main control board 6 via a connecting terminal to obtain the control instruction; a mechanical output end of the drive motor 8 is connected to the curtain shaft 11, and the curtain shaft 11 is driven to rotate during operation, thereby winding or unwinding the curtain pieces 12; and the curtain pieces 12 in this solution may be shutter blinds, honeycomb blinds, blind fabrics, etc.

The drive motor 8, the lithium battery and the main control board 6 are arranged on a same side of the curtain body frame 1, the main control board 6 is positioned on a side of the curtain body frame 1, and the drive motor 8 and the lithium battery are arranged next to the main control board 6, thereby making full use of an installation space in the curtain body frame 1, such that the overall structure of the hollow curtain is more compact. The size of the drive motor 8 is equivalent to the size of the lithium battery, thereby preventing the lithium battery from affecting the curtain winding and unwinding of the curtain shaft 11.

The solar panel 9 is arranged on a left side (a right side) of the curtain body frame 1, and the drive motor 8, the lithium battery and the main control board 6 are arranged on the right side (the left side) of the curtain body frame 1, thereby achieving the effect of counterweight balance to a certain extent, and avoiding the risk of deflection of the curtain body frame 1 due to the fact that all the components are arranged on the same side.

The technical features of the above embodiments may be combined arbitrarily. For the sake of brevity, all possible combinations of the technical features in the above embodiments are not described. However, as long as there is no contradiction in the combinations of these technical features, all should be considered to be within the scope of this specification.

The above embodiments only express some implementations of the present invention, and the descriptions thereof are relatively specific and detailed, but cannot be understood as limiting the scope of patent protection of the present invention. It should be noted that various modifications and improvements that can be made by those of ordinary skill in the art without departing from the concept of the present invention belong to the scope of protection of the present invention. Therefore, the scope of patent protection of the present invention shall be on the basis of the appended claims.

What is claimed is:

1. An integrated control type hollow curtain, comprising a front glass panel, a rear glass panel and a curtain body frame, the front glass panel and the rear glass panel being hermetically connected to front and rear surfaces of the curtain body frame to form a hollow curtain with a sealed cavity, wherein an electronic control system and a solar panel are arranged in the top of the sealed cavity;

the electronic control system comprises a drive motor, a main control board and a battery; the main control board integrates a wireless transceiver and a control chip; the wireless transceiver is configured to obtain a control signal of a wireless remote controller and then transmit the signal to the control chip; the wireless remote controller and the wireless transceiver are connected in a paired manner via a magnetic inductive code pairing key; and the control chip is configured to receive the control signal and send an instruction to the drive motor to control operation of the drive motor;

the top of the curtain body frame is provided with a front baffle and a rear baffle; and the front baffle and the rear baffle are connected to define a rectangular cavity for shielding the electronic control system;

the front baffle is a straight plate, and the rear baffle is a C-shaped folded plate; the rear baffle comprises a side plate, an upper plate and a lower plate; and the front baffle, the side plate, the upper plate and the lower plate define the rectangular cavity;

upper and lower sides of the front baffle are provided with inner hook edges; edges of the upper plate and the lower plate of the rear baffle are provided with grooves that are respectively adapted to the two inner hook edges of the front baffle; and during connection, the inner hook edges of the front baffle slide into the grooves along the grooves of the rear baffle from a side direction, until the ends of the front baffle and the rear baffle are aligned with each other;

the middle of an inner wall of the rear baffle is provided with a raised transverse division bar; the drive motor is installed above the transverse division bar; the battery is installed below the transverse division bar; and the drive motor is stacked on the battery;

a distance between a upper plate and a lower plate of the rear baffle is equal to a sum of heights of the drive motor and the battery;

the solar panel is installed on an outer surface of the rear baffle and positioned inside the hollow glass;

the wireless transceiver is provided with a receiving antenna, and the receiving antenna is a flexible circuit board (FPC) antenna; and both a length of the front glass panel and a length of the rear glass panel are greater than a length of the curtain body frame, and both widths are also greater than a width of the curtain body frame, such that a circle of recesses are formed in an outer side of the hollow curtain.

2. The integrated control type hollow curtain according to claim 1, wherein the FPC antenna is attached to an inner side surface of the front baffle or the rear baffle at the top of the curtain body frame.

* * * * *